(12) United States Patent
Rupp

(10) Patent No.: US 8,272,829 B1
(45) Date of Patent: Sep. 25, 2012

(54) TRAILER ASSEMBLY

(76) Inventor: Ronald L. Rupp, Archbold, OH (US)

( * ) Notice: Subject to any disclaimer, the term of this patent is extended or adjusted under 35 U.S.C. 154(b) by 449 days.

(21) Appl. No.: 12/655,346

(22) Filed: Dec. 30, 2009

(51) Int. Cl.
*B60P 1/04* (2006.01)

(52) U.S. Cl. ...................................... 414/485; 414/482

(58) Field of Classification Search .................. 414/482, 414/444, 468, 469, 481, 484, 485, 537, 538, 414/642, 639, 697, 435, 437, 462, 471, 495, 414/577; 280/5.3, 5.511, 6.15, 6.155, 33.995, 280/33.996, 639, 38, 39, 40, 656, 43.17, 280/43.22, 43.13, 2, 789, 46, 47.1
See application file for complete search history.

(56) References Cited

U.S. PATENT DOCUMENTS

| | | | | |
|---|---|---|---|---|
| 3,768,677 A * | 10/1973 | Moss | ................................ | 414/476 |
| 3,817,546 A * | 6/1974 | Sugiura | ........................ | 280/43.12 |
| 4,003,583 A * | 1/1977 | Stanzel | ........................ | 280/43.22 |
| 4,934,733 A * | 6/1990 | Smith et al. | ............ | 280/124.132 |
| 5,056,977 A * | 10/1991 | May | .................................. | 414/12 |
| 5,161,814 A * | 11/1992 | Walker | ........................ | 280/414.5 |
| 5,232,232 A * | 8/1993 | Kishi | ............................ | 280/43.1 |
| 5,234,308 A * | 8/1993 | Mann | .............................. | 414/480 |
| 5,403,024 A * | 4/1995 | Frketic | ........................ | 280/43.12 |
| 5,474,320 A * | 12/1995 | Bojarski et al. | ............ | 280/5.521 |
| 5,474,416 A * | 12/1995 | Rogge et al. | .................... | 414/482 |
| 6,273,435 B1 * | 8/2001 | Stringer | ........................ | 280/6.151 |
| RE37,351 E * | 9/2001 | Crean | ............................ | 296/168 |
| 6,378,893 B1 * | 4/2002 | Jager | ............................. | 280/656 |
| 6,502,894 B1 * | 1/2003 | Ingram et al. | .................. | 296/168 |
| 6,540,241 B2 * | 4/2003 | Lee | .............................. | 280/43.12 |
| 6,557,882 B2 * | 5/2003 | Harrington | ................ | 280/415.1 |
| 6,695,287 B1 * | 2/2004 | De Boer | ........................ | 254/10 C |
| 6,923,452 B1 * | 8/2005 | Zachmeier et al. | ......... | 280/6.151 |
| 6,945,744 B1 * | 9/2005 | Swanson | ........................ | 414/482 |
| 7,052,033 B2 * | 5/2006 | McDonell | ...................... | 280/656 |
| 7,059,626 B2 * | 6/2006 | Koch | ................................ | 280/656 |
| 7,163,212 B1 * | 1/2007 | Rupp | ............................ | 280/43.17 |
| 7,188,857 B2 * | 3/2007 | Richard et al. | ................. | 280/482 |
| 7,401,804 B1 * | 7/2008 | Rupp | ............................. | 280/656 |
| 7,547,025 B2 * | 6/2009 | Coates | ........................ | 280/43.23 |
| RE41,126 E * | 2/2010 | Hurlburt | ........................ | 414/482 |
| 7,780,185 B2 * | 8/2010 | McConkey et al. | ........... | 280/656 |
| 8,172,248 B2 * | 5/2012 | Groves | ........................ | 280/414.5 |
| 2005/0067799 A1 * | 3/2005 | Smith | ............................ | 280/6.151 |
| 2005/0157785 A1 * | 7/2005 | Kitamura et al. | ......... | 375/240.03 |
| 2005/0184485 A1 * | 8/2005 | Timmermans | ................ | 280/656 |
| 2007/0045993 A1 * | 3/2007 | Jager | ............................. | 280/656 |

* cited by examiner

*Primary Examiner* — Saul Rodriguez
*Assistant Examiner* — Glenn Myers
(74) *Attorney, Agent, or Firm* — John G. Chupa

(57) ABSTRACT

A trailer assembly 10 having a frontal support and storage portion 12 and a back support and storage portion 14 and the portions 12 and 14 are selectively and independently articulatable, such that portion 14 may be selectively raised and lowered independent of the movement of the portion 12, portion 12 may be selectively raised and lowered independently of the portion 14, and both portions 12 and 14 may be lowed and raised in a substantial concurrent manner in order to facilitate the loading and unloading of items upon and/or from the trailer assembly 10 without the need for a ramp or other such aid.

4 Claims, 6 Drawing Sheets

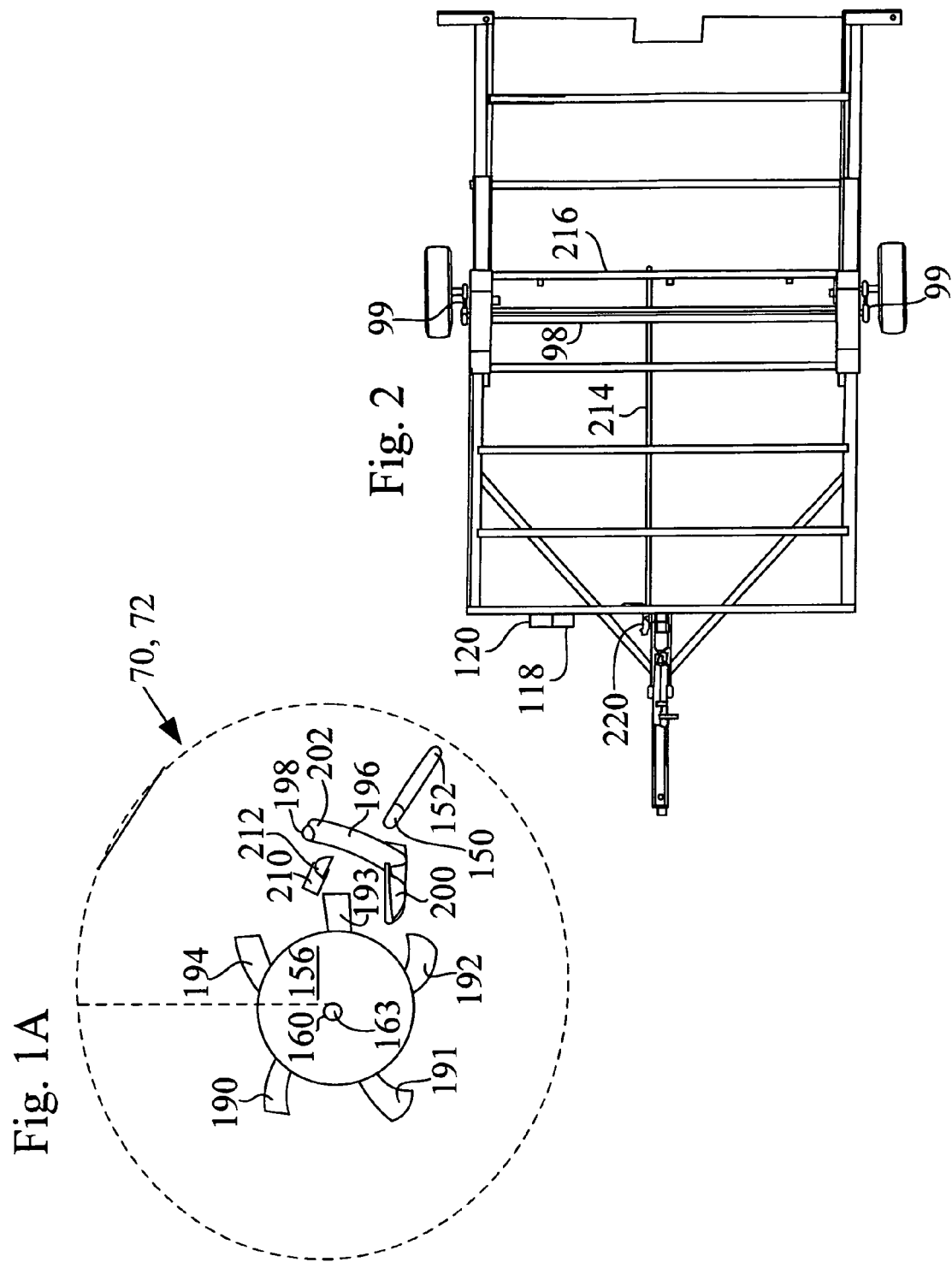

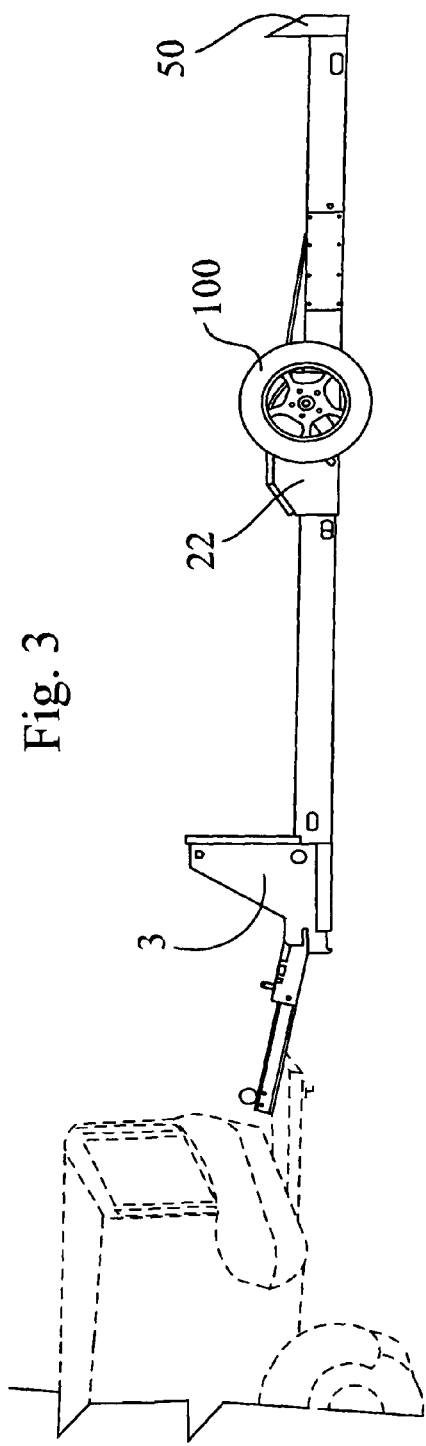
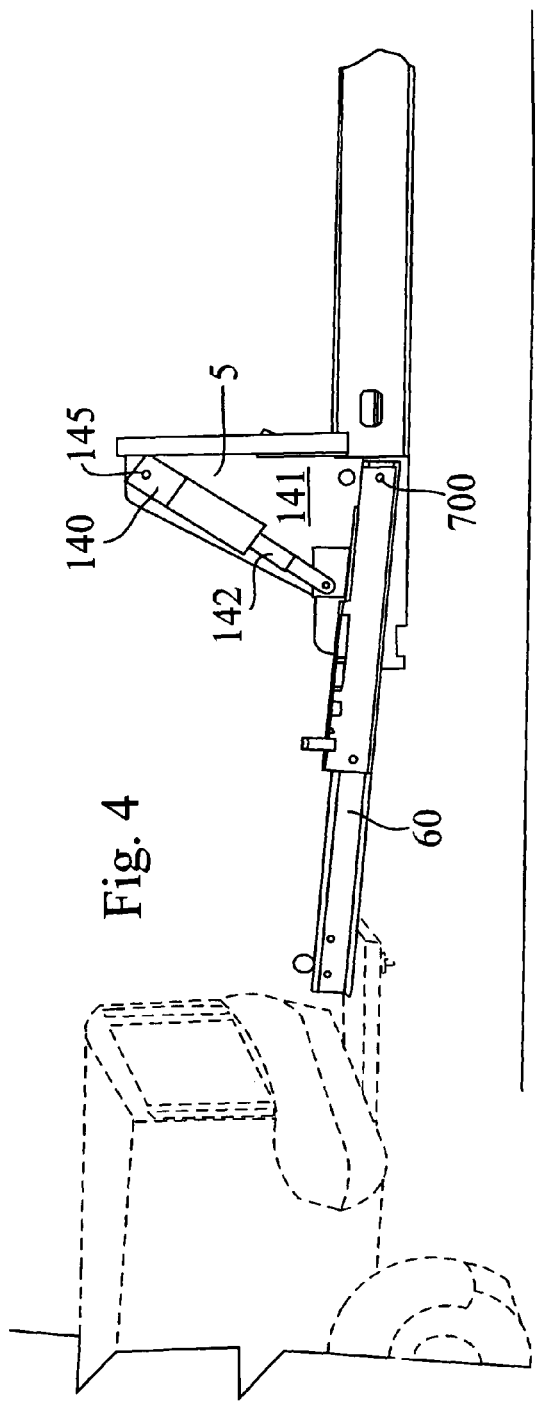

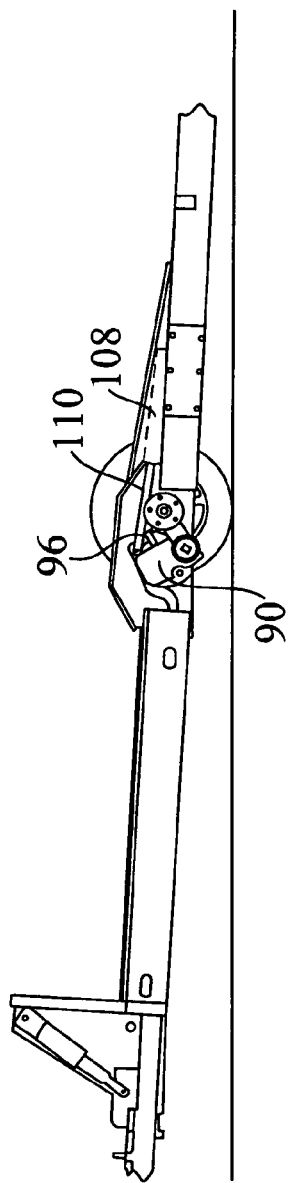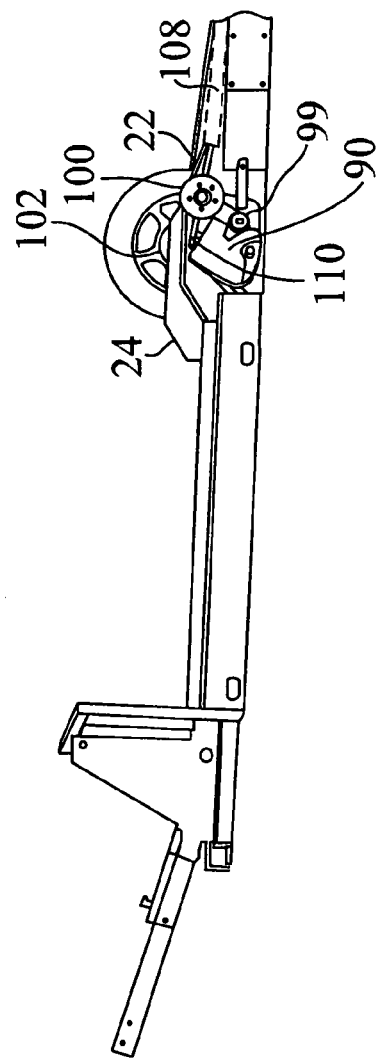

TRAILER ASSEMBLY

GENERAL BACKGROUND

1. Field of the Invention

The present invention generally relates to a trailer assembly and more particularly, to a new and novel trailer assembly which allows items to be quickly and efficiently loaded onto the trailer assembly and selectively removed from the trailer assembly due to the various positions that the trailer assembly may quickly and efficiently assume.

2. Background of the Invention

Trailer assemblies are used to selectively receive and/or load, support, transport, and/or otherwise deliver/unload items to a particular location. While these trailer assemblies do perform the afore-described general functions, they are oftentimes difficult to load and unload a wide variety of items due to their inability to assume a wide variety of differing load configurations. That is, these trailer assemblies typically include and require a separate ramp or are adapted to be used in combination with a ramp or angled member upon which the various items to be loaded upon the trailer must be transported. The ramp or member must be selectively attached to, and then removed from the trailer.

These ramps are cumbersome and very difficult to use, especially with heavy or awkward shaped loads. For example, great care and effort must be expended to forcibly push or "wheel" heavy loads up the ramp and such efforts typically require the services of more than one person, thereby undesirably increasing the overall cost of loading such a trailer assembly. Awkward shaped loads (e.g, loads having a non-symmetrical shaped exterior and/or having a large base which is wider than the ramp) makes it likely that the load may inadvertently fall of the ramp and injury the workers and damage the load itself. The ramps often become dislodged from the trailer assembly, thereby causing injury and damage to the various items respectively placed on the ramps, and injury to workers.

There is therefore a need for, and it is a non-limiting object of the present invention to provide, a new and improved trailer assembly which overcomes some or all of the previously delineated disadvantages of prior trailer assemblies and which, by way of example and without limitation, allows for the relative easy and efficient loading and unloading of various type of loads.

SUMMARY OF THE INVENTION

It is a first non-limiting object of the present invention to provide a trailer assembly which overcomes some or all of the previously delineated drawbacks of prior trailer assemblies, such as those, by way of example and without limitation, are set forth above.

It is a second non-limiting object of the present invention to provide a trailer assembly which may selectively assume a variety of loading configurations.

It is a third non-limiting object of the present invention to provide a trailer assembly which may be selectively loaded and unloaded in an efficient and relatively safe manner.

According to a first non-limiting aspect of the present inventions, a trailer assembly is provided and includes a reception portion having a front portion and a back portion; a first movement portion which is coupled to the front portion and which selectively lowers the front portion; and a second movement portion which is coupled to the back portion and which lowers the back portion independently of the movement of the front portion caused by the first movement portion, wherein the first and second movement portions also cooperate to selectively and horizontally lower the front and back portions in a substantially concurrent manner.

According to a second non-limiting aspect of the present inventions, a trailer assembly is provided and includes a first frame portion which provides a first reception portion; a second frame portion which provides a second reception portion; a pair of connection members which are each coupled to the first and second frame portions; a first movement member which is pivotally coupled to a first of the pair of the connection members and which selectively and reciprocally rotates about the first of the connection members; a second movement member which is substantially identical to the first movement member, which is pivotally coupled to a second of the pair of the connection members and which selectively and reciprocally rotates about the second of the connection members; a torsion member which is movably and transversely disposed through the first and second connection members and which is coupled to each of the first and second movement members; a pair of wheel which are coupled to opposed ends of the torsion member; a first reciprocally movable cylinder which is coupled to the first movement member; a second reciprocally movable cylinder which is coupled to the second movement member; and a cylinder control assembly which selectively causes the first and second cylinders to respectively and concurrently rotate the first and second movement assemblies in a counterclockwise direction, effective to selectively raise the second frame member.

According to a third non-limiting aspect of the present invention, a trailer assembly is provided and includes a first generally rectangular frame portion; a second generally rectangular frame member; a first connection member having an arcuate cross sectional area and being coupled to the first and second frame portions; a second connection member having an arcuate cross sectional area and begin coupled to the first and second frame portions; a first movement member having a generally flat body including a notch portion and a flange portion which is disposed on the body of the first movement portion and along a portion of the notch portion, the generally flat body being pivotally coupled to the first connection member and selectively rotatable along the first connection member; a locking member which is movably disposed along the first connection member and which is selectively movable from a first position remote from the flange to a second engagement position in which the locking member engages the flange of the first movement portion and prevents appreciable rotation of the first movement member; a second movement member which is substantially similar to the first movement member and having a second notch portion and a second flange which is disposed on the body of the second movement member and along a portion of the second notch portion, wherein the second movement member is pivotally coupled to the second connection member and being selectively along the second notch portion; a second locking member which is movably disposed along the second connection member and which is selectively movable from a first position remote from the second flange to a second engagement position in which the second locking member engages the second flange and prevents appreciable rotation of the second movement member; a first cylinder which is operatively disposed within the second frame portion and which is coupled to the first movement member, the first cylinder being movable from a first retracted position to a second extended position in which the first movement member is rotated in a counter clockwise direction; a second cylinder which is operatively disposed within the second frame portion and which is coupled to the second movement member, the second cylinder being movable from a first retracted position to a second extended position in which the second movement member is rotated in a counter clockwise direction; a torsion member which traverses the first and second connection members and the first and second movement members and which is rotatably disposed within the first second connection members; a first wheel which is coupled to the first movement member; a second wheel which is coupled to the second movement member; a master locking member which is operatively disposed on the first frame portion and which is coupled to the first and second locking members and which selectively and concurrently moves the first and second locking members from a respective remote position to a respective second engagement position; and a cylinder controller which is operatively disposed upon the first frame portion and which selectively and concurrently cause the first and second cylinders to become respectively extended, thereby rotating the movement members in a counter clockwise direction, thereby selectively raising the first and second frame portions and concurrently allowing the first and second cylinders to be extended when the first and second locking members are each in their respective remote positions, thereby allowing the first and second frame members to be selectively lowered.

These and other features, aspects, and advantages will become apparent from a reading of the detailed description of the preferred embodiment of the invention, including the subjoined claims, and by reference to the following drawings.

BRIEF DESCRIPTION OF THE DRAWINGS

FIG. 1(a) is an exploded partial view of a portion of the trailer assembly which is shown in FIG. 1 and denoted as portion "1(a)".

FIG. 2 is a top view of the trailer assembly which is shown in FIG. 1.

FIG. 3 is a side view of the trailer assemblies shown in FIGS. 1 and 2, and shown in assembled relationship with a selectively movable vehicle.

FIG. 4 is a partial side view of the front portion of the trailer assembly which is shown in FIGS. 1-3 and which is shown as being selectively moved in a first manner taught by the preferred embodiment of the invention, and which is further shown in an assembled relationship with a selectively movable vehicle.

FIG. 5 is a partial side view of the trailer assembly which is shown in FIGS. 1-4 and which is being shown as being selectively moved in a second manner taught by the preferred embodiment of the invention, and further shown without one of the wheels which is shown in FIGS. 1-4.

FIG. 6 is a partial side view of the front and back portions of the trailer assembly which is shown in FIGS. 1-5 and which are being moved in a third manner which is taught by the preferred embodiment of the invention, further shown without one the wheels which are shown in FIGS. 1-4.

DETAILED DESCRIPTION OF THE PREFERRED EMBODIMENT OF THE INVENTION

Figure 1:
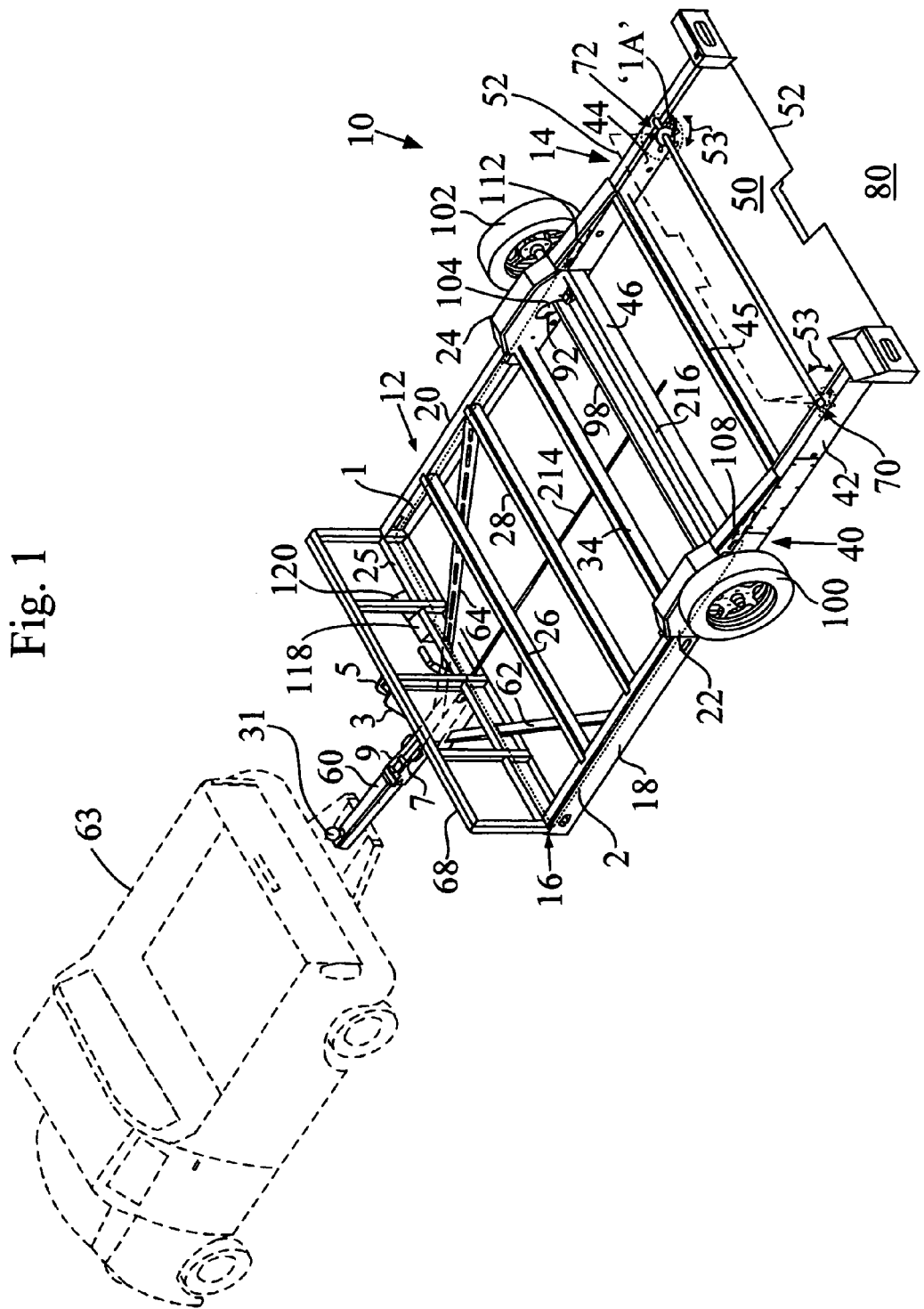
FIG. 1 is a perspective view of a trailer assembly which is made in accordance with the teachings of the preferred embodiment of the invention, and shown in assembled relation with a selectively movable assembly.
Figure 7:
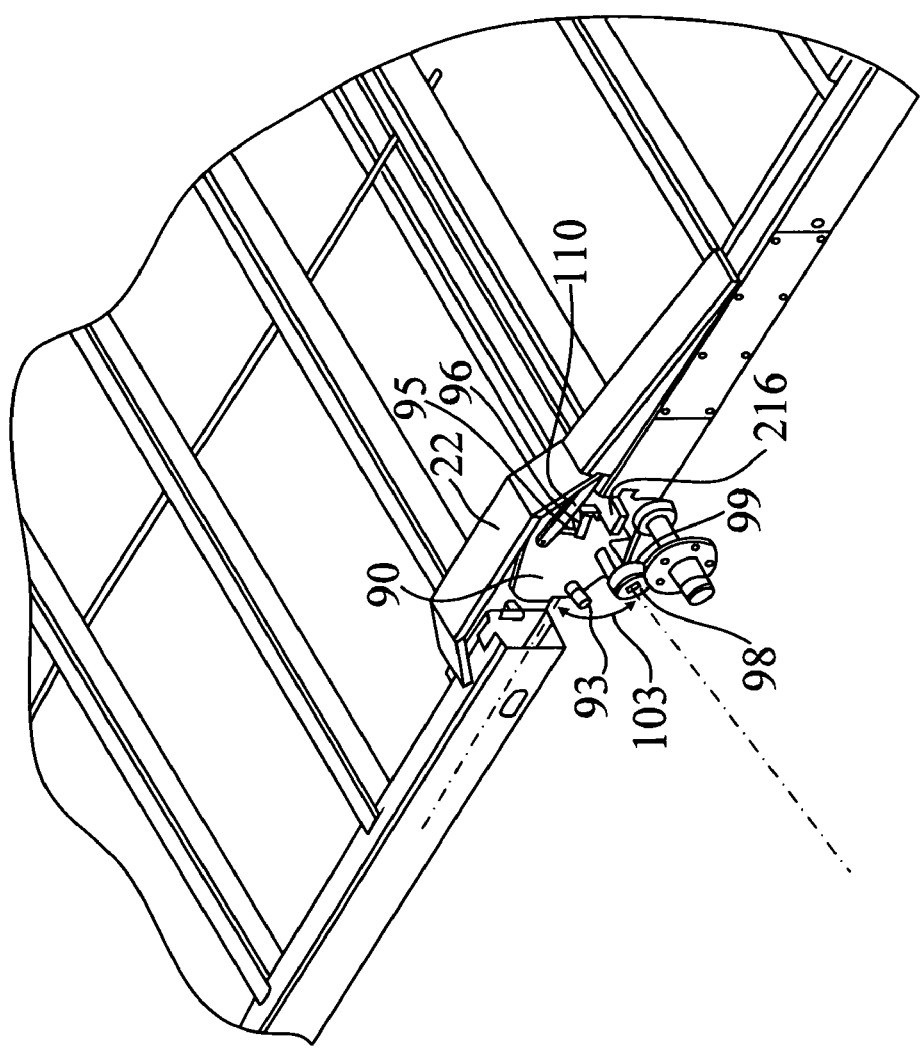
FIG. 7 is an exploded perspective view of a portion of the trailer assembly which is shown in FIG. 6 and shown in absence of the wheel.
Figure 8:
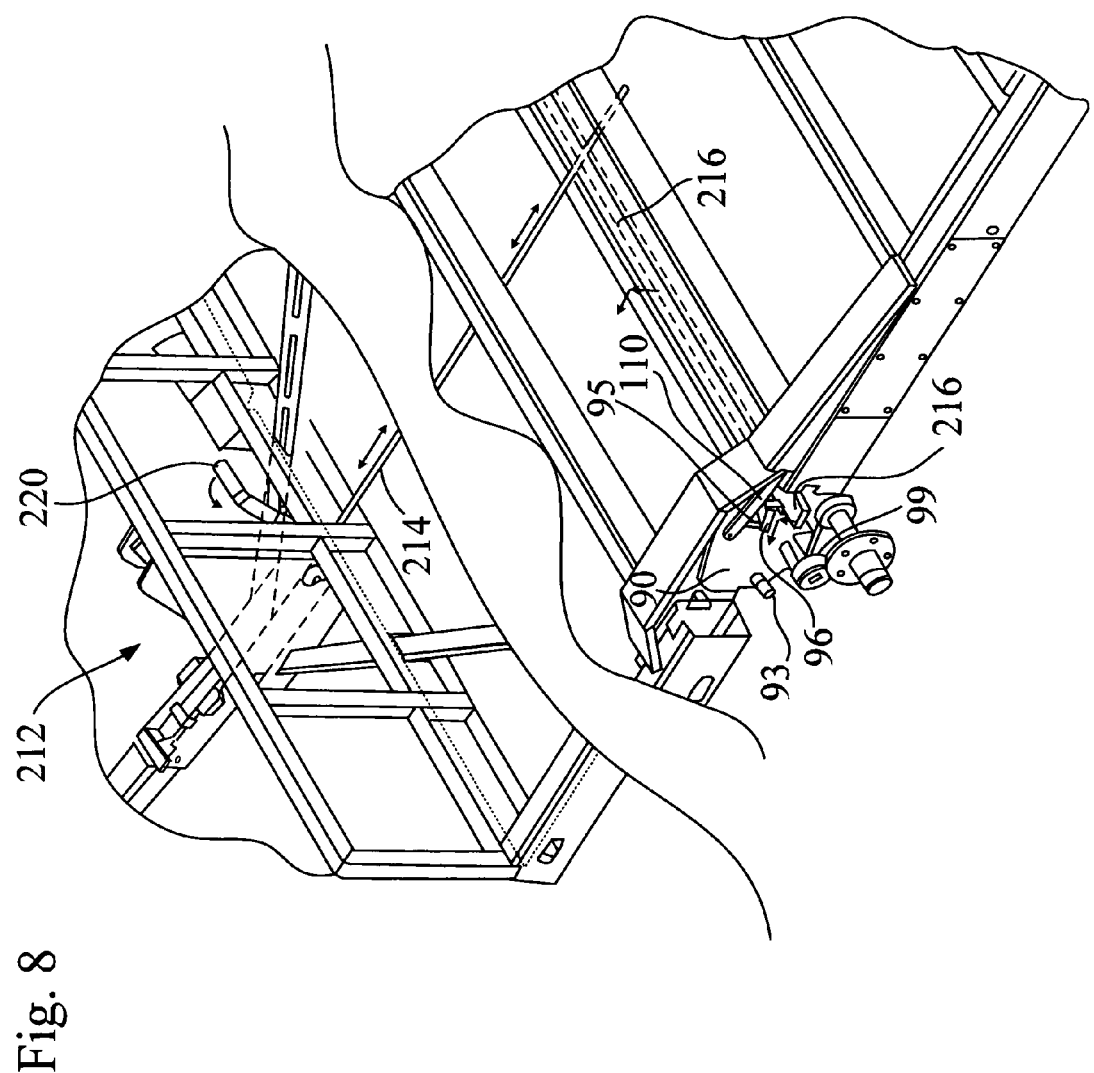
FIG. 8 is an exploded partial view of the trailer assembly shown in FIGS. 1-8.

Referring now to FIGS. 1-8, there is shown a trailer assembly 10 which is made in accordance with the teachings of the preferred embodiment of the invention.

Particularly, the trailer assembly 10 includes a generally rectangular front reception/storage portion 12 and a generally rectangular back reception/storage portion 14. That is, as shown, the front reception/storage portion 12 includes a generally "C-shaped" frame portion 16 having opposed side members 18, 20 which terminate into (e.g., are respectively coupled to or are respectively and integrally formed with) respective and substantially identical arcuate connection members 22, 24. The frame portion 16 includes a front member 25 which is coupled to or which is integrally formed with members 18, 20. The front portion 12 also includes equidistantly spaced transverse members 26 and 28 which are respectively and orthogonally coupled to opposed members 18, 20 of the frame portion 16. The front portion 12 also includes a third transverse member 34 which is coupled to or is integrally formed with connection members 22, 24. The members 26, 28, and 34 are substantially similar and mutually parallel, in one non-limiting embodiment. The transverse members 26, 28, and 34 cooperate with the frame portion 16 to form a front reception area 12 or portion 12 upon which various items may be selectively, securely and removably placed. Members 26, 28, and 34, in one non-limiting embodiment, are longitudinally coextensive, and may be substantially dissimilar in size and shape.

The back portion 14 includes a generally "C-shaped" frame portion 40 having opposed and substantially identical members 42, 44 which are in a parallel and longitudinally coextensive relationship and extending in a direction away from the front portion 12. Each of the members 42, 44 terminate into (e.g., are respectively coupled or integrally formed with) a member 46 which is parallel to transverse members 26, 28, and 34. The member 46 is coupled to or is integrally formed with the arcuate connection members 22, 24. The back portion 14 further includes a planar member 50 which is coupled to the members 42, 44 and which has an edge 52 which is parallel to the transverse member 46 when the member 50 is positioned as shown. In one non-limiting embodiment of the invention, the planar member 50 forms an acute angle 53 with each of the members 42, 44 (e.g., member 50, in its extended position, slightly tilts downward to the ground 80). Also, the back portion 14 includes a transverse member 45 which terminates into the members 42, 44 and which is parallel to member 46. The members 45, 46, 50 cooperate with the frame portion 40 to form a back reception area or portion 14 upon which various items may be selectively, securely, and removably placed. Members 45 and 46 may or may not be substantially similar in size and shape.

The trailer assembly 10 also includes a tongue member 60 which is coupled to or is integrally formed with the member 25 and which orthogonally projects from the member 25 in a direction away from the planar member 50. The tongue member 60 further, in one non-limiting embodiment of the invention, is coupled to the front portion 12 by substantially similar angular members 62, 64 which cooperatively stabilize or stiffen the attachment of the tongue member 60 to the members 18, 20, thereby making for a more overall secure connection of the tongue member 60 to a selectively movable vehicle, such as selectively movable assembly 63. A pair of generally triangular shaped tongue support members 3, 5 respectively couples a unique side 7, 9 of tongue 60 to the member 25 (and to member 68) thereby, further providing a secure connection of the tongue 60 to the portion 12. Members 62, 64 may respectively traverse members 3, 5, before being coupled to the tongue 60.

That is, the front portion 12 includes a rectangular and up-right and generally rectangular "stop" or support member 68 which is coupled to the front member 25 and which is orthogonal to front member 25. The members 18, 20, 26, 28 cooperatively define a storage compartment or support assembly 12 upon which an items or items may be selectively deployed and later removed. The upright member 68 functions to frontally support the selectively deployed items and to provide a convenient wall upon which such contained items may be strapped or otherwise secured. Similarly, the members 44, 42, 45, and 46 cooperatively define a back storage and support assembly upon which an item or items may be selectively deployed and later removed. The back and front storage compartments 12, 14, are separated by the pair of substantially similar arcuate members 22, 24 and these compartments or portions 12, 14 are selectively and independently articulatable, in a manner which will be further discussed below. The term "independently", in this context, means that a first of the portions 12, 14 can move without causing or requiring a movement of a second of the portions 12, 14.

The planar member 50 may function, if it is desired, as an integral ramp upon which items may be transported and delivered to the front portion 12 and back portion 14, thereby allowing these selectively transported items to be easily and selectively and removably placed upon these areas. However, in one embodiment, although non-limiting, use of the invention, such a ramp 50 is not needed. The term "integral ramp" means that the ramp 50 is an integral part of the trailer assembly 10 and not a separate and readily removable item, thereby being very securely "connected" to or formed with the assembly 10.

In one non-limiting embodiment a pair of ratchet assemblies 70, 72 may respectively couple to member 42, to member 50; and member 44 to member 50, and these substantially identical ratchet assemblies 70, 72 allow the planar portion 50 to be selectively lowered or tilted to the ground 80 upon which the trailer assembly 10 resides and then selectively placed into an upright position, as shown in phantom in FIG. 1. In this upright position, the planar portion (and now upright portion) 50 provides a convenient place for items residing in the back portion 14 to be strapped or stored and the upright planar portion 50 cooperates with the member 68 to secure the contained items within the trailer assembly 10, and to function as a "backstop". The movement of the planar member 50 may alternatively be achieved by a motor assembly or by a hydraulic control assembly. The member 50 may be alternatively coupled to the members 42, 44 by pins or other fasteners which allow for such desired selective movement of the portion 50. It should be appreciated that the tongue portion 60 is adapted to be selectively coupled to a selectively movable vehicle, such as an truck 63, and such coupling allows the trailer assembly 10 (and, of course, the items which selectively and removably reside upon the front portion 12 and/or the rear portion 14) to be selectively moved to a desired location for removal and deployment. The coupling may be achieved by selectively and removably coupling the tongue portion 60 to a ball 31 which operatively resides on assembly 63.

In one non-limiting embodiment, each ratchet assembly 70, 72 is substantially identical and only one such ratchet assembly 70, 72 need to be discussed. Such a ratchet discussion is now more fully presented with respect to FIGS. 1 and 1(*a*).

The assembly 72 includes a drum or gear wheel 156 which is rotatably deployed within or upon the member 44 (e.g., the generally round drum or gear wheel 156 is fixed upon or within the member 44 by a "through type" pin or member 160 and the pin or member 160 lies along an axis 163 about which the drum 156 may selectively rotate). Particularly, the pin or member 160 selectively rotates within or upon the member 44 and such rotation is transferred to the drum or gear wheel 156.

In the most preferred, although non-limiting embodiment of the invention, projecting from the drum 156 and integrally formed with the drum 156 are a plurality of substantially identical projections, gears or flanges, such as gears, projections, or flanges 190, 191, 192, 193, and 194. Further, disposed within the assembly 72 (within or upon the member 44) is a pawl or boot shaped member 196 which pivots about the pin 198 and the pin 198 movably secures the member 196 within or upon the member 44. The "foot shaped" end 200 of the member 196 is deployed between two adjacent projections 192, 193 while the "leg shaped" end 202 is actually coupled to the pin 198. Further, a slot 210 is formed within or upon the slot 210 the member 44 and a lever 212 is movably fixed the slot 210 (upon or within the member 44) by the use of a pin or some other conventional fastener strategy. Alternatively, the lever 212 just frictionally and movably resides within the formed slot 210. The lever 212 is constrained to selectively move within the slot from a first selected position which is shown in FIG. 1(*a*) and in which the lever 212 is remote from the leg portion 202, to a second selected position in which the lever 212 selectively contacts the leg portion 202 and causes the foot portion 200 to move away from contact with any of the projections 190-194 and away from a position between any adjacent pairs of projections 190-194.

In operation, when the member 50 is fully and outwardly (e.g., downwardly) deployed, as is perhaps shown best in FIG. 1, individuals may quickly and easily enter and exit from the selectively movable assembly 10 and these individuals may carry material and/or other items into and/or out of the selectively movable assembly 10. When it is desired to selectively place member 50 in an upright position, the lever 212 is moved to a position remote from the projections 190, 191, 192, 193, and 194, thereby allowing the member 50 to be moved to an upward position. That is, drum 156 is free to rotate which allows the member 50 to be selectively moved upwardly. The upright member 50 may then be secured as desired in this upright position (e.g., a member 150 may be slideably disposed in slot 152, formed in member 44, and pushed to engage member 196 which causes member 196 to actually and frictionally engage drum 156, thereby preventing rotation of the drum 156. Other fastening techniques may be used. To selectively lower the member 50, the lever 212 is moved to a position in contact with protrusions 190, 192, 193, 194, and lever 150 is made to be remote from the drum 156 and this allows clockwise rotation of the drum 156 and selective downward movement of member 50. Ratchet 72 prevents the member 50 from inadvertently being placed in an upright position and allows member 50 to be securely placed at a number of positions between the fully upright position and the fully extended position. Assembly 70 is similar to assembly 72 but mounted on and/or with member 42.

The trailer assembly 10 further includes a pair of substantially identical and generally arcuate shaped movement members 90, 92 which are respectively and pivotally coupled to connection members 22, 24 by a respective pin 93. Each of the arcuate shaped members 90, 92 include a notch 95 and a flange 96 which is positioned along a portion of the notch 95. The trailer assembly 10 further includes a torsion member or axle 98 which is parallel to transverse members 26, 28, 34, 46, and 45; which traverses the connection members 22, 24; and which further traverses the movement members 90, 92. Each end of the torsion member 98 which respectively protrudes from a movement member 90, 92 has a generally "l shaped" offset portion 99 which respectively receives a unique one of the wheels 100, 102. Each of the portions 90, 92 forms a respective right angle 103 with the portion of member 99 which is respectively and actually coupled to or which is respectively and integrally formed with the portions 90, 92. More particularly, each connection member 22, 24 has a respective and substantially identical slot 104 through which the torsion member 98 traverses and movably resides. A hydraulic cylinder 108 resides within the connection member 22 and upon/within member 42 and has a selectively extendable arm 110 which is coupled to the movement member 90. A hydraulic cylinder 112 also resides within the connection member 24 and upon/within member 44, and is similarly connected, by a selectively extendable arm 110, to the movement member 92. Further, the trailer assembly includes a source 118 of hydraulic fluid which is communicatively coupled, by conduit 1, to each of the cylinders 108, 112, and is further coupled and controlled by fluid controller 120. In one non-limiting embodiment, the source 118 and controller 120 are each operatively coupled upon and/or attached to the member 25.

That is, fluid controller 120 (which may, in one non-limiting embodiment comprise a pump and vacuum assembly) operated by a user of the trailer assembly 10, may selectively allow (e.g., pump) fluid to be sourced to each of the hydraulic cylinders 108, 112 and when such fluid is sourced to these cylinders 108, 112, then the arms 110 substantially and concurrently move against respective movement members 90, 92 and such substantial concurrent movement causes the movement members 90, 92 to substantially and concurrently rotate or pivot in a substantially concurrent and counterclockwise direction, and such substantial and concurrent movement of the movement members 90, 92 causes the wheels 100, 102 to rotate in a counterclockwise manner (i.e., off of the ground 80). Such movement (see, for example, FIG. 6) is effective to lower the back portion 14 to the ground 80 in a manner which allows items to be easily loaded onto and removed off of the back portion 14 without the use of an external ramp, or by use of member 50. When the controller 120 releases or causes the sourced fluid to be sent back to the source of hydraulic fluid 118 (e.g., by vacuum pressure) and when the previously sourced fluid returns to the source 118, the movement members 90, 92, by the force of gravity, rotate in a clockwise manner and move against the respective arms 110, effective to lower the wheels 100, 102 and lifting the back portion 14 away from the ground 80 (see, for example, FIG. 3). The arms 110 therefore reciprocally move within cylinders 108, 112 (e.g., the arms 110 move toward and away from tongue 60).

Further, the trailer assembly 10 includes a third cylinder assembly 140 having a selectively extendable arm 142 which is coupled to the tongue 60. The assembly 140, in one non-limiting embodiment, is attached to the a side 141 of member 5 by pin 145 and is coupled to source 118. When hydraulic fluid is selectively sourced to the cylinder assembly 140 (from source 118), the arm 142 is moved downward against the tongue 60, thereby moving the front portion 12 against the ground 80, thereby allowing items to be easily and effectively removed from and loaded onto the front portion 12, without the use of a ramp. In one non-limiting embodiment, the tongue 60 is pivotally coupled to the member 25 by pin 700.

When fluid is sourced to the cylinder assembly 140 and the cylinder assemblies 108, 112 then the front portion 12 and the back portion 14 move against the ground 80 in a substantially concurrent manner, thereby allowing the entire front portion 14 and the back portion 16 to be placed on the ground 80 in a substantially concurrent manner, thereby allowing items to be placed on both or either of portions 14, 16 without the use of a ramp. Thus, portions 14, 16 move independently of each other and are respectively and selectively articulatable from a respective first position which is respectively remote from the ground 80, to a respective second independent movement position which is respectively "ground engaging".

In one non-limiting embodiment of the invention, the trailer assembly 10 further includes a locking assembly 212 which includes members 214, 216. Member 214 is either coupled to or integrally formed with member 216. Particularly, member 216 is parallel to transverse members 34, 45, 46 and member 214 traverses underneath of members 26, 28, 34 and under member 98 being coupled to lever 220, which resides on tongue 60. When lever 220 is moved toward back portion 14, then the member 214 is moved in a direction toward the back portion 14 and this movement causes the coupled member 216 to be remote from the respective flanges 96 of movement members 90, 92, thereby allowing the movement members 90, 92 to rotate in the previously described manner. However, when the trailer assembly 10 is being pulled by a selectively movable vehicle or at other times in which it is desired to ensure that the trailer assembly remain upright and off the ground 80, then the lever 220 is moved away from the back portion 14, and such selective upward movement causes the member 214 to moved toward the front portion 12 and such frontal movement causes the member 216 to also move to the frontal direction and this causes the member 216 to be struck by respective flanges 96, thereby preventing appreciable movement or rotation of the movement members 90, 92, effective to ensure that the trailer assembly 10 remain upright. In one non-limiting embodiment, member 214 may be movably coupled to transverse members 26, 28 by hooks or some other conventional fasteners.

It is to be understood that the inventions are not limited to the exact construction or methodology which has been illustrated above, but that various changes and modifications may be made without departing from the spirit and the scope of the inventions as they may be further delineated in the following claims.

What is claimed is:

1. A trailer assembly comprising a first generally rectangular and "C" shaped frame portion comprising a front member; a first side member having first and second opposed ends and wherein said first end is coupled to a first end of said front member; a second side member having a first and second opposed ends and wherein said first end is coupled to a second end of said front member and which is linearly coextensive to said first side members and wherein said front member and said first and second side members cooperatively form a "C" shape, and wherein said first generally rectangular "C" shaped frame portion further includes a first transverse member which is orthogonally coupled to said first and second side members, a second transverse member which is orthogonally coupled to said first and second side members and which is longitudinally coextensive to and parallel to said first transverse member, and a third transverse which is longitudinally coextensive to and parallel to said first and second transverse members; and a pair of accurate connection members, wherein a first of said pair of accurate connections members is coupled to a first end of said third transverse member and to said second end of said first side member, and a second of said pair of accurate connection members is coupled to a second end of said third transverse member and to said second end of said second side member, and whereby said front member, said first second, and third transverse members, and said pair of accurate connection members cooperatively from said first generally rectangular "C" shaped frame portion, wherein said trailer assembly further comprising a second frame portion which is coupled to said pair of accurate connection members and which comprises a second generally rectangular and "C" shaped frame portion comprising a fourth transverse member which is parallel to each of said first, second and third transverse members and which is coupled to each of said pair of accurate connection members, third and fourth side members which are respectively coupled to said first and second accurate connection members of said pair of accurate connection members and wherein said third and fourth side members are paralleled to each other and longitudinally coextensive, respectively extending in a direction away from said first generally rectangular and "C" shaped frame portion; a fifth transverse member which is parallel to and longitudinally coextensive with said first, second, third, and fourth transverse members and which is coupled to said third and fourth side members; and a planar member which is movably coupled to said third and fourth side members and which is selectively movable from a first position in which said planar member forms an acute angle with respect to each of said third and fourth side members to a second position, and wherein said assembly fourth and fifth transverse members cooperate with said second and third side members and said planar member to form said second generally rectangular "C" shaped frame portion, and wherein said trailer assembly further comprising a torsion member which is parallel to each of said first, second, third, fourth and fifth transverse members and which has first and second opposed ends which are respectively coupled to and traverse said first and second connection members, wherein said trailer assembly further comprising a tongue member which orthogonally projects from said first traverse member; a first triangular member which couples said tongue member to said first transverse member; a second angular member which couples said tongue member to said first transverse member; a first triangular member which couples said tongue member to said first side member; a second angular member which couples said tongue member to said second side member; a first hydraulic cylinder which is operatively disposed upon said first triangular member and which selectively moves against said tongue member and thereby selectively lowers said first generally rectangular and "C" shaped frame portion, and wherein said trailer assembly further includes a first movement member having a generally flat body which is pivotally coupled to said first connection member and which receives a first end of said torsion member; a second movement member having a general flat body which is pivotally coupled to said second connection member and which receives a second end of said torsion member; a second hydraulic cylinder assembly which is coupled to said first movement member and which selectively rotates said first movement member in a first direction; a third hydraulic cylinder assembly which is coupled to said second movement member which selectively rotates said second movement member in a second direction while said first movement member is being rotated in said second direction, thereby cooperating with said first movement member to selectively lower said second generally rectangular and "C" shaped frame portion independently of the selective movement caused by said first hydraulic cylinder assembly; a first wheel which is coupled to said first movement member; a second wheel which is coupled to said second movement member; and a controller assembly which is coupled to said first, second, and third hydraulic cylinder assemblies and which causes said first, second, and third hydraulic cylinder assemblies to selectively move said tongue, selectively rotate said first movement member and selectively rotate said second movement member.

2. The trailer assembly of claim 1 wherein said torsion member traverses each of said movement members.

3. The trailer assembly of claim 2 further comprising a locking assembly which is coupled to each of said movement members and which selectively prevents rotation of each of said movement members.

4. The trailer assembly of claim 3 further comprising at least one ratchet assembly which couples said planar member to said third side member.

* * * * *